Patented Apr. 8, 1947

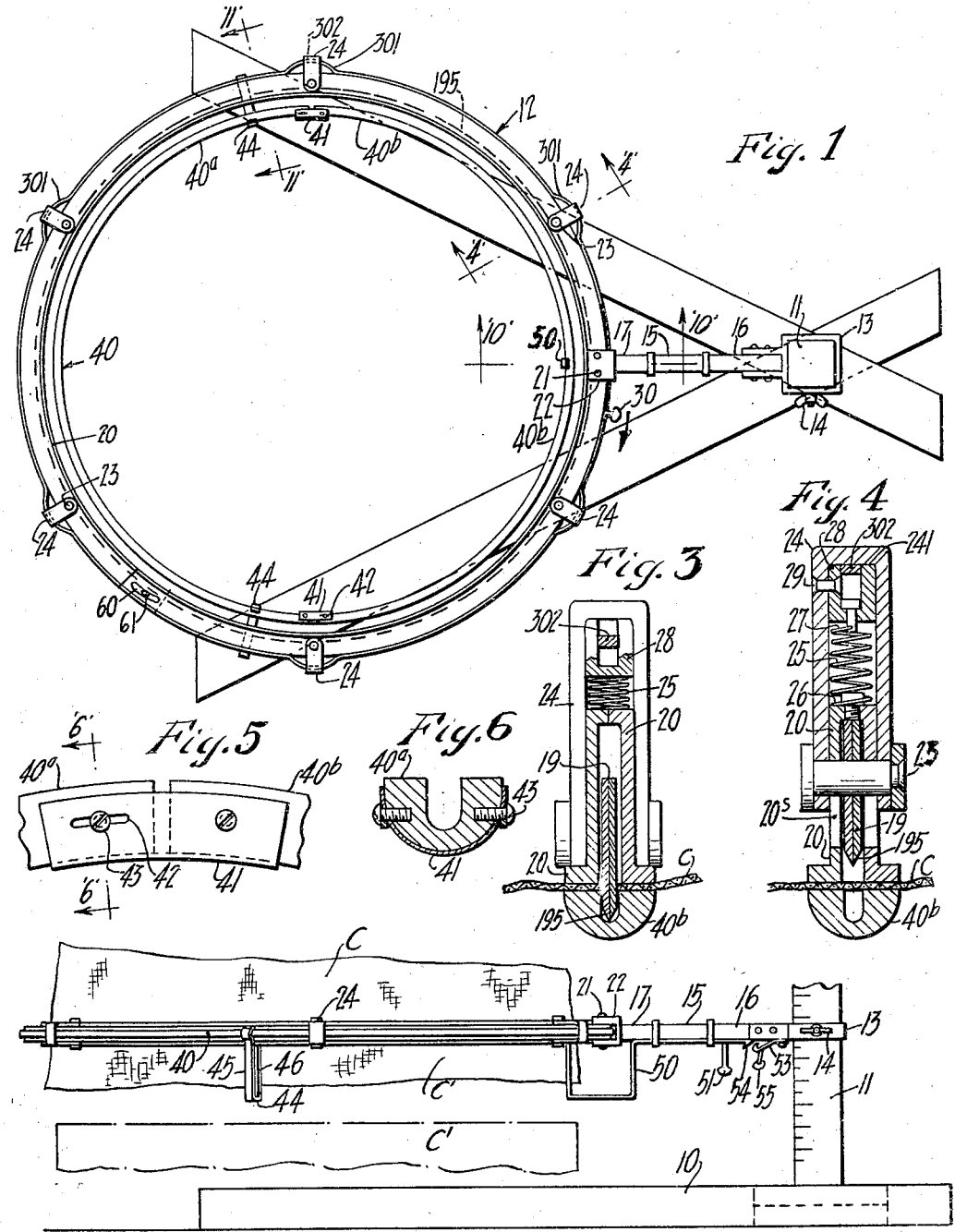

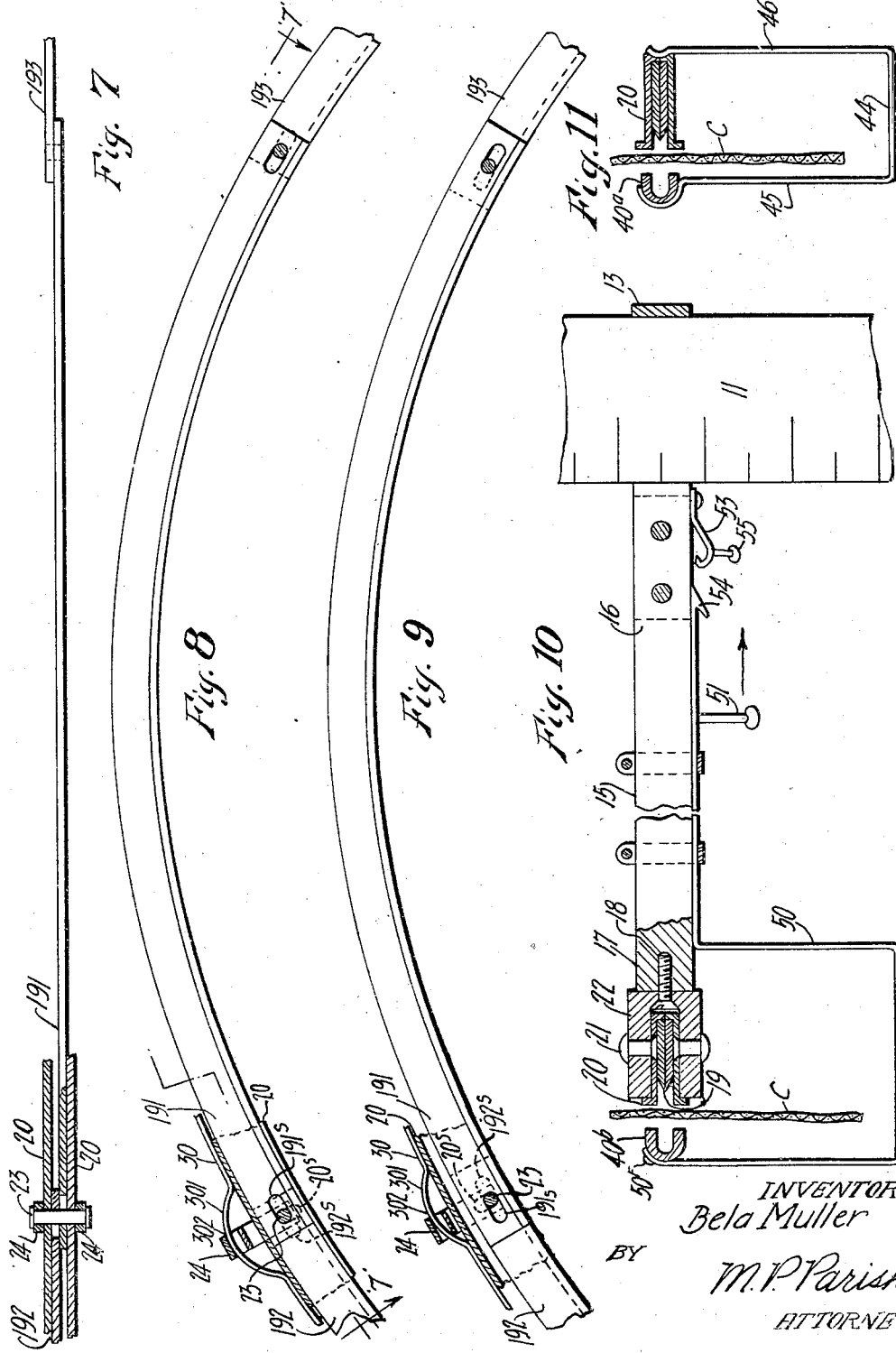

2,418,596

UNITED STATES PATENT OFFICE 2,418,596

CIRCULAR CLOTH CUTTER

Bela Muller, New York, N. Y.

Application May 7, 1945, Serial No. 592,348

2 Claims. (Cl. 164—71)

This invention relates to cloth cutting devices particularly cloth which has been manufactured into garments such as women's skirts having a bottom edge to be desirably cut in a suitable and preferably horizontal plane, a suitable distance from the floor on which the wearer stands while the worn skirt is cut.

An object of the invention is the provision of novel means to grasp a circular tubular cloth garment tightly in a circular clamp to present the clamped portion of cloth to a circular cutting edge of a knife for instant complete circular cut of the cloth with one stroke of the knife blade.

Another object is the provision of means to adjustably position my novel cutter mechanism a measured distance up from a floor and to maintain the cutter in a horizontal plane.

Still another object is the provision of a circular releasable band connected with the knife which band upon arcuate released motion slidably moves the knife mechanism into cutting position to cut the circularly held cloth throughout its circular length with one movement of the knife.

These and other objects are attained by my device as described in the following specification and as shown in the accompanying drawings in which, Fig. 1 is a top plan view of my novel circular cutting device.

Fig. 2 is a front elevation view of the device of Fig. 1 and showing a skirt before having its bottom portion cut from its upper part (the dot-dash lines indicating the bottom cut-off portion after having been severed from the upper portion).

Fig. 3 and Fig. 4 are section views taken on the line 4—4 of Fig. 1 respectively showing the knife blade after having cut the held cloth and before cutting the held cloth.

Fig. 5 is a plan view of a sliding splice connector means for joining two semi-circular U-shaped rings to form my ring clamp member.

Fig. 6 is a section of the device of Fig. 5 taken on line 6—6 of Fig. 5.

Fig. 7 is a front view partly in section of my knife blade showing a method of joining arcuate knife segments for relative sliding movement and taken on line 7—7 of Fig. 8.

Fig. 8 is a plan view of the device of Fig. 7 and showing a number of knife blade segments being held by my release band in non cutting position.

Fig. 9 is a plan view of the device of Fig. 7 showing a number of knife blade segments after release by movement of my release band and shown in cutting position.

Fig. 10 is a front elevation partly in section taken on line 10—10 of Fig. 1 and showing unclamped cloth in position ready to be clamped and cut.

Fig. 11 is a section view taken on line 11—11 of Fig. 1 showing a bracket holding my device at a radial point therealong.

In Figs. 1 and 2 a suitable base 10 has mounted vertically thereon a graduated post 11 on which is suitably slidably mounted my cutting device 12 by a band-bracket 13 having wing-nut-stud 14. Clockwise turn of the stud tightens the band 13 to the post 11 at a selected distance upward along the post 11. Arm 15 (see Fig. 10) has an end 16 mounted on bracket 13, its other end 17 having fixed thereon my knife cutter mechanism by means of fastener 18. The circular knife blade 19 composed of a number of segments 191, 192, 193 is mounted with member 15 for arcuate slide in outer ring 20 in turn fastened by rivets 21 to bracket 22 in turn fastened by fastener 18 on element 17 of arm member 15.

Figs. 7, 8 and 9 show a preferred method of slidably joining said blade segments 191, 192 etc. Suitable slots 191s, 192s receive a rivet 23 therethru to provide mount of the segments for arcuate slide in a horizontal plane.

Figs. 3 and 4 show a preferred method of carry of the slidably joined segments in suitable brackets 24 at for example six points along the circular blade. Spring means 25 having an end 26 fastened to outer ring 20 and an opposite end 27 attached to member 28 normally tends to draw the blade toward member 28 which latter member is fastened to bracket 24 by fastener 29. Bracket 24 slidably carries knife 10 at said six points by means of rivets 23.

A series of convex bulges 301 formed in band-release-member 30 are slidably carried in members 28 so that the crest 302 of the bulge engages shoulder 241 when the band 30 is in knife-lock position as in Fig. 4. Arcuate movement of the band 30 to position the crest 302 as in Fig. 3 releases the knife mechanism so that the knife has moved from the position of Fig. 4 through the cloth C to the position of Fig. 3.

In Figs. 5, 6, 2, 10 and 11 I show my clamp ring 40 having two semi-circular segments 40a and 40b joined by sleeve members 41 the latter having slots 42 to slidingly receive fastener 43. Brackets 44 having spring arms 45 and 46 yieldably mount the clamp ring with the knife mechanism so that movement of the lever-bracket 50 and handle 51 to the right as the arrow shows, carries the ring expandingly in the same direction, the slot 42 facilitating said ring expansion. Cloth C already between the ring 40 and the outer ring knife mechanism is thus gripped between elements 40a, 40b and 20. A lock claw 53 yieldably receives tooth 54 to hold said clamp ring 40, cloth C and element 20 together and thus prepares the tightened cloth for cutting with the knife 19. A knob 55 on member may be used to release said lock.

In operation when the crest 302 of the projecting bulges 301 of the outer circular band 30 are engaged with the brackets 24 the knife cutting edge 195 is placed in non-cutting position as shown in Fig. 4.

To actuate the knife blade it is noted that spring 25 normally tends to contract from the abnormal or expanded position of spring 25 as shown in Fig. 4 and when the spring is abnormally positioned it is seen the knife is, as stated, in non-cutting position and the crests 302 of the bulges 301 are engaged with the shoulders 241 of the brackets 24.

When the crests 302 are disengaged with the brackets 24 the normally contracting springs 25 contract, as shown in Fig. 3 and carry the brackets 24 (having mounted knife 19) slidably over the outer ring 20 to engage the knife edge 195 with the cloth C thereby cutting the cloth. Other spring actuating means may be provided to move the bracket and the knife.

It is to be noted that the inner clamp ring, the circular segmental knife and the outer ring may be expandable and contractable. I, however, prefer the outer ring to be fixed and non-contractable.

While I have shown a mechanism practical of operation other means may be provided to attain the result. It is intended that my disclosure be illustrative rather than limitative.

I claim:

1. A cutting device having a base carrying an upright graduated rod on which the cutter mechanism is mounted, an arm having a strap around the rod having a screw for engaging the strap with the rod, said cutter being mounted on the strap-arm and comprising a knife, an inner circular clamp and a spaced apart outer circular knife ring removably engageable with each other, a number of resilient brackets each having two arms engaging and mounting the rings, a knife and a U-shaped knife holder connected with the strap-arm and also engaging the outer ring, means removably engaging the clamp ring with the knife ring to clamp cloth therebetween comprising a lever fixed on the clamp ring and slidably engaging the strap-arm, a circular segmental knife slidingly mounted on the outer ring and having a cutting edge engageable with the clamped cloth when the knife slides in the outer ring towards the inner clamp ring.

2. A cutting device having a base carrying an upright graduated rod on which the cutter mechanism is mounted, an arm having a strap around the rod having a screw for engaging the strap with the rod, said cutter being mounted on the strap-arm and comprising a knife, an inner circular clamp and a spaced apart outer circular knife ring removably engageable with each other, a number of resilient brackets each having two arms engaging and mounting the rings, a knife and a U-shaped knife holder connected with the strap-arm and also engaging the outer ring, means removably engaging the clamp ring with the knife ring to clamp cloth therebetween comprising a lever fixed on the clamp ring and slidably engaging the strap-arm, a circular segmental knife slidingly mounted on the outer ring and having a cutting edge engageable with the clamped cloth when the knife slides in the outer ring towards the inner clamp, means to releasably hold the knife against the slide comprising, a number of brackets each having fasteners on the outer ring and engaged thru slots in the knife, a spring in each bracket having two ends, one end fastened on the bracket and the other end fastened on the outer ring and normally drawing the ring toward the brackets, a band slidable around the outer ring and having bulges engageable with the brackets and holding the spring abnormally expanded, a handle on the band for disengaging the bulges from the brackets and releasing the spring from abnormal position to slide the knife in the outer ring to cut the clamped cloth.

BELA MULLER.

REFERENCES CITED

The following references are of record in the file of this patent:

UNITED STATES PATENTS

| Number | Name | Date |
|---|---|---|
| 2,308,052 | Carillo et al. | Jan. 12, 1943 |